Aug. 12, 1969
R. R. LAUPMAN
3,460,196
APPARATUS FOR TEMPERING AND COOLING A WEB OR STRAND OF
THERMOPLASTIC MATERIAL COMPRISING A PLASTICIZER
Original Filed Feb. 23, 1965
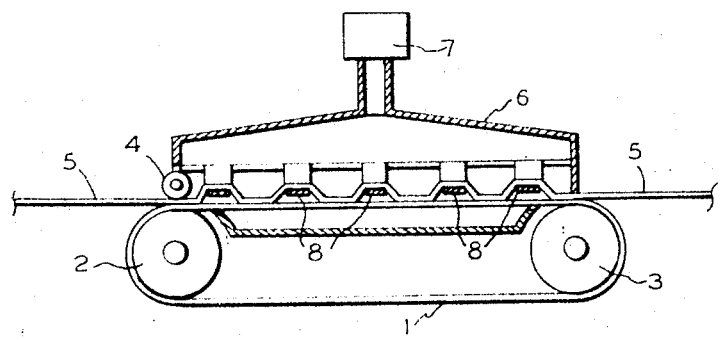
INVENTOR
ROBERT R. LAUPMAN
BY *Wenderoth, Lind & Ponack*
ATTORNEYS United States Patent Office 3,460,196
Patented Aug. 12, 1969

3,460,196
APPARATUS FOR TEMPERING AND COOLING A WEB OR STRAND OF THERMOPLASTIC MATERIAL COMPRISING A PLASTICIZER
Robert Ronald Laupman, Wijchen, Netherlands, assignor to N.V. Nederlandse Extrusie Maatschappij, Wijchen, Netherlands
Original application Feb. 23, 1965, Ser. No. 434,355. Divided and this application Aug. 15, 1968, Ser. No. 752,835
Claims priority, application Netherlands, Feb. 20, 1964, 6401561; Apr. 24, 1964, 6404550, 6404551
Int. Cl. B29f 5/00
U.S. Cl. 18—1                                         1 Claim

ABSTRACT OF THE DISCLOSURE

An apparatus for relieving the shrinking stresses of a web or strand of thermoplastic material having a plasticizer and a temperature which is high relative to the ambient temperature wherein the material is passed on to a conveyor belt at a velocity equal to that of said conveyor belt. The material is cooled as it is conveyed on the conveyor belt. The material is subjected to breaking forces which together exceed the sum of the frictional forces between said material and said conveyor belt. This may be accomplished by transverse braking strips.

---

This application is a division of my application Ser. No. 434,355, filed Feb. 23, 1965, now abandoned, entitled "Method and an Apparatus for Tempering and Cooling a Web or Strand of Thermoplastic Material Comprising a Plasticizer."

The present invention relates to an apparatus for tempering and cooling a web or strand of thermoplastic material comprising a plasticizer.

It is well-known that in processing and deforming thermoplastic materials such as PVC, containing a plasticizer, stresses may arise in the deformed material.

These stresses increase according as the relevant deforming temperature is lower, and is further below the plasticizing temperature of the synthetic material in question. When after the operation concerned the resulting product is cooled, the stresses created will be "frozen in" within the material. Accordingly, it is known to subject articles of thermoplastic materials comprising a plasticizing agent to a thermal after-treatment when they have gone through the plastic deformation to remove the frozen stresses from the material. As a rule this thermal after-treatment consists in bringing the article to a temperature which is far above the temperature at which the article is normally used. The article is then maintained at this temperature for some time, and thereafter cooled with as little stress as possible.

Normally difficulties arise in this cooling process, which can be explained as follows.

Be it assumed that a sheet-like object has been put on a smooth carrying plate during cooling. Upon tempering of the stresses the object will tend to move over the carrying plate. This, however, will result in an equilibrium between the frictional resistance between the object and the carrying plate on the one hand, and the contraction strain in the object on the other. The resulting equilibrium stress will remain in the material as a residual stress, and will be frozen in upon further cooling. Afterwards this frozen stress will still make itself felt at room temperature as an undesirable change in the shape or dimensions of the product in question.

This problem is more prominent, even, in continuous processes in which webs of material are formed at high temperatures and then cooled. In that case, during the tempering and cooling process, the long endless web will increase the problem of the frictional resistance between the web and the carrier on the one hand and the occuring stresses in longitudinal direction of the moving web on the other.

It is an object of the present invention to provide a solution for the continuous manufacture of webs or strands of thermoplastic material, such as PVC containing a plasticizer, such webs or strands being brought to and maintained at a suitable tempering temperature after their plastic deformation, by the provision of means for keeping the webs of strands substantially free of stresses during the subsequent cooling process.

Thus the present invention provides an apparatus for tempering and cooling a web or strand of thermoplastic material comprising a plasticizer, said web or strand having a temperature which is high relative to the ambient temperature, said apparatus comprising means for passing the web or strand on to a conveyor belt at a velocity equal to that of said conveyor belt, cooling the web or strand as it is conveyed further on said conveyor belt and subjecting the web or strand to braking forces which together exceed the sum of the frictional forces between the web or strand and the conveyor belt.

It may be advantageous to pass the web or strand through a heated tempering duct after it has been passed on to the conveyor belt and before it is subjected to the cooling.

A further object is to provide an apparatus wherein such apparatus comprises an endless, preferably smooth, conveyor belt, means cooperating with said belt to impart the conveyor belt's speed to said web or strand, cooling means for cooling said material on said conveyor belt and further a plurality of fixed support members, such as strips, extending transversely and spaced longitudinally of said conveyor belt at some distance above said belt, the upper side of said support members being shaped complementary to the underside of the web or strand to be passed over said support members.

The invention will be further described with reference to the accompanying drawing, illustrating, by way of example, an embodiment of the invention and showing a diagrammatic side view and longitudinal section of an apparatus according to the invention.

A conveyor belt 1 is passed over a roller 2 which is driven by means not shown and a following roller 3. A roller 4, disposed above the roller 2, presses a web or strand 5 of thermoplastic material comprising a plasticizer against the conveyor belt 1 adjacent the roller 2. The active upper run of the conveyor belt 1 is surrounded by a tunnel 6, to which cooling air is supplied by a fan 7. As the web or strand 5 is cooled in the tunnel 6, it will tend to become shorter. This reduction in length is usually the result of a combination of the thermal contraction owing to the cooling and a physical aftereffect of the tempering process. Since the web or strand 5 is pressed on to the conveyor belt 1 by means of roller 4, in such a manner that at that point the web or strand is unable to slide relative to the conveyor belt 1, the web or strand will gradually lag behind the conveyor belt 1 due to said contraction.

The roller 4 cooperating with conveyor belt 1 is a gripping or nipping roller. No compression operation or any other shaping of the strand is carried out at this point since all shaping operations on the strand are terminated prior to feeding the strand on to the conveyor belt. Roller 4 only engages the strand of plastics in order to ensure equal speeds for conveyor belt and web or strand of plastics at the beginning of the cooling and stress relieving operation.

Now, the web or strand 5 should have an opportunity of contracting itself in such a manner that all forces released during the cooling and contracting process can fully exhaust themselves and are not retained in the material.

In the embodiment illustrated a series of braking strips 8 is fixedly mounted above the conveyor belt 1 in the cooling tunnel 6. The width and the spacing of the strips, longitudinally of the web are such that there is an equilibrium between the forces exerted on the web 5 by the conveyor belt 1 and the braking force which the strips 8 exercise on the web 5 sliding over them. The width of the braking strips 8 is mostly selected to be approximately equal to the length of web resting on the conveyor belt 1 between two braking strips 8.

At the end of the belt the material should of course be carried off without tension longitudinally of the material. This removal may be effected by suitable means, for example a cutting device or a tension-free rolling-up device.

I claim:

1. An apparatus for relieving the shrinking stresses of a web or strand of thermoplastic material having a plasticizer and a temperature which is high relative to the ambient temperature comprising an endless, smooth, conveyor belt, a nipping roller cooperating with said belt to impart the conveyor belt's speed to said web, cooling means for cooling said material on said conveyor belt, and a plurality of fixed support members extending transversely of said belt and spaced longitudinally of said conveyor belt above said belt with the upper side of said support members shaped complementary to the underside of said material passed over said support members.

References Cited

UNITED STATES PATENTS

| | | |
|---|---|---|
| 1,792,316 | 2/1931 | Leguillon. |
| 1,973,059 | 9/1934 | Gerke. |
| 2,032,656 | 3/1936 | Finney. |

WILLIAM J. STEPHENSON, Primary Examiner

U.S. Cl. X.R.

18—2